UNITED STATES PATENT OFFICE.

RUDOLF TORNYAY-SCHOSBERGER, OF BUDAPEST, AUSTRIA-HUNGARY.

PROCESS OF MANUFACTURING CEMENT.

983,521.     Specification of Letters Patent.     Patented Feb. 7, 1911.

No Drawing. Original application filed March 1, 1909, Serial No. 480,672. Divided and this application filed March 14, 1910. Serial No. 549,331.

*To all whom it may concern:*

Be it known that I, RUDOLF TORNYAY-SCHOSBERGER, a subject of the King of Hungary, residing at Budapest, in the Empire of Austria-Hungary, have invented new and useful Improvements in Processes of Manufacturing Cement, of which the following is a specification.

The present application is a divisional of my U. S. application, for which Letters Patent were issued April 12, 1910, No. 954,658.

My invention relates to a process of manufacturing cement from a waste product of the beet sugar industry.

The object of my invention is the manufacturing of different varieties of cements, possessing the highest qualities and a perfect uniformity by converting the caustic lime which is used in the manufacturing of beet sugar for clearing the sugar-juices, and which forms at present as saturation-slime a low-grade waste product of the sugar refining process, into cement, and to this end I add materials containing silicates to the caustic lime in a quantity corresponding to the percentage of silicates contained in the raw material of the cement. It is possible to employ the saturation-slime for the manufacturing of cement by drying and pulverizing it, mixing it with substances containing silicates and finally shaping and burning the mass. This process, however, is not very economical, because the pulverizing of the dried saturation-slime and the following mixing with the silicates is considerably expensive.

According to my invention the substances containing silicate are not added to the dried saturation-slime, but directly to the sugar-juices which are mixed with caustic lime whereby the saturation-slime will possess already when separated a composition required for the manufacturing of cement. The silicates may be brought directly into the saturater containing the sugar-juice which has been already mixed with lime-water. By the process of saturation with carbonic acid a thorough and perfect mixing of the materials takes place, such as could not, by far, be obtained by any of the processes of manufacturing cement known up to this time, neither by the dry, nor by the so-called wet processes. The fact that the mixing is effected in a pretty thin liquid, is very favorable for obtaining a good result. The saturation mud, containing the silicates which is separated by the saturation with carbonic acid and thereupon filtered in a suitable manner, possesses already such a percentage composition, that after the following burning, a cement of the required variety results without further steps. It is evident, that by this way cement of different varieties, such as Portland cement, Roman cement, and slag cement may be manufactured.

The process is carried out in the following manner:—Lime water is added in the usual manner to the beet-sugar juices. To the juices contained in the saturater to which the lime has already been added, a silicate of such a quality and in such a quantity is added, that it corresponds to the known composition of the cement desired, for instance of Portland cement; the resulting liquid mass is then saturated with carbonic acid gas. During the saturation process, the mass is very thoroughly mixed by the gas (carbonic acid) which is passed through it and therefore the separated saturation-mud contains the substances necessary for the production of cement finely dispensed and closely mixed with each other. The addition of substances containing silicates to the sugar juices containing lime in no way impairs the clearing of the sugar-juices. On the contrary, it even permits of working juices from beets which have begun to rot, without any objection, whereas the working of such juices offers, as known, difficulties by the usual treatment with lime. After the saturation process the mud is pressed in filter presses in a well-known manner and may thereupon directly be burned without previously forming it, as the mud-cakes coming from the filter presses crumble by themselves into small pieces of the size of peas or hazelnuts. No forming is therefore necessary and moreover every burned charge is altogether equally and perfectly done.

The cement, for instance, Portland cement, produced according to my process is a very high-grade product.

I claim:—

1. The process of manufacturing cement, which consists in adding caustic lime to the sugar juices in the manufacture of beet-sugar, adding silicates to the mixture thus produced, saturating the liquid mixture thus produced with carbonic acid, removing the liquid from the saturation-mud obtained, burning said mud, and finally pulverizing the product obtained to cement without further steps.

2. The process of manufacturing cement, which consists in adding caustic lime to the sugar juices in the manufacture of beet-sugar, adding materials containing silicates to the mixture thus produced, saturating the liquid mixture thus produced with carbonic acid, removing the liquid from the saturation-mud obtained, burning said mud, and finally pulverizing the product obtained to cement without further steps.

3. The process of manufacturing cement, which consists in adding silicates to the mixture of sugar-juices and caustic lime obtained in the manufacture of beet-sugar, saturating the liquid mixture thus produced with carbonic acid, removing the liquid from the saturation-mud obtained, burning said mud, and finally pulverizing the product obtained to cement without further steps.

In testimony whereof I affix my signature in presence of two witnesses.

RUDOLF TORNYAY-SCHOSBERGER.

Witnesses:
  HUGH KEMÉURY,
  LESBIE L. CSOSZI.